Oct. 8, 1935.    J. K. STAFFORD    2,016,911
PROTECTIVE SYSTEM
Filed Sept. 28, 1933

Inventor:
John K. Stafford
by Harry E. Dunham
His Attorney.

Patented Oct. 8, 1935

2,016,911

UNITED STATES PATENT OFFICE 2,016,911

PROTECTIVE SYSTEM

John K. Stafford, Pittsfield, Mass., assignor to General Electric Company, a corporation of New York Application September 28, 1933, Serial No. 691,351

8 Claims. (Cl. 175—294)

My invention relates to protective systems for electrical units, and more particularly to protective systems for multiple-unit capacitor installations.

Although my invention is applicable to multiple-unit installations of various types of electrical units, such for example, as reactors, capacitors and resistors, the application thereof which is at present believed to be the most important is to multiple-unit installations of capacitors. In installations of capacitors, such for example, as for purposes of power factor improvement, it is common to connect a plurality of similar capacitors in series-parallel so that units of convenient physical size and cost may be employed and by making the proper connections, the installation may be adapted for power factor improvement at various circuit voltages. By series-parallel connection I mean a connection in which groups of two or more capacitors in series are connected in parallel with each other. In installations of this character it is important to provide protective means for both indicating the location of a unit which has failed, and also for disconnecting the entire installation or the portion thereof which contains the unit which has failed.

In accordance with my invention, I provide a novel and simple protective means of the above character. My invention is a combined electrical and mechanical system and employs heater elements which are normally deenergized but which are energized upon the failure of a unit, and these heater elements have associated therewith a combustible element, such for example, as a tensioned silk cord which is burned through when a heater element becomes energized. With such an arrangement, the location of the point at which the cord is burned through serves as an indication of the location of the unit which has failed, and also the burning through of the cord can be made to release suitable protective means, such for example, as means for tripping circuit breakers or for giving a suitable signal.

An object of my invention is to provide new and improved protective means for electrical apparatus.

Another object of my invention is to provide novel and simple protective means for multiple-unit capacitor installations.

My invention will be better understood from the following description taken in connection with the accompanying drawing, and its scope will be pointed out in the appended claims.

Figure 1:
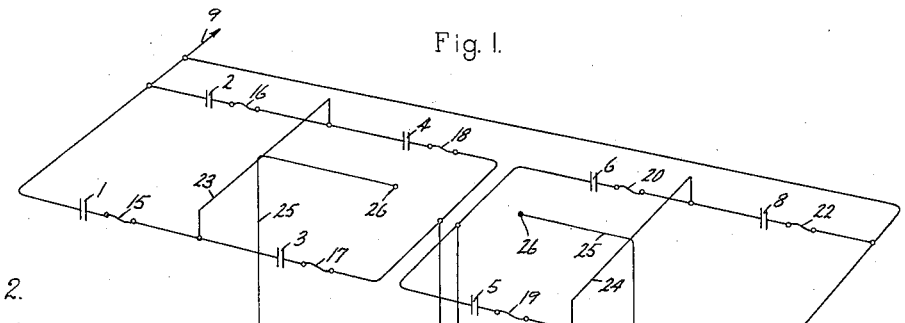
Figure 2:
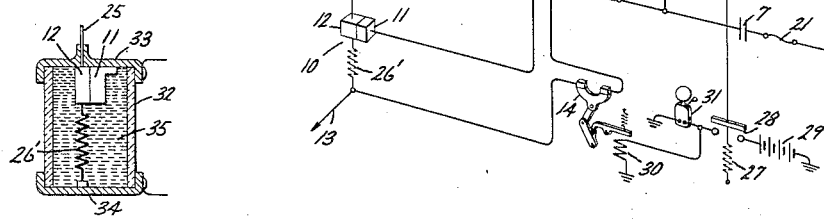
Figure 3:
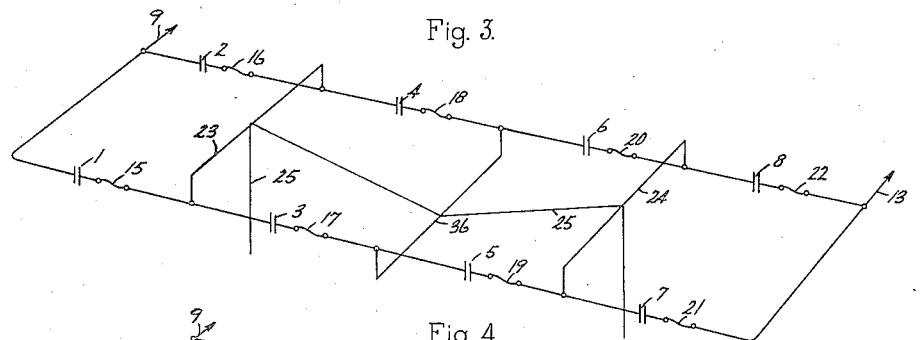
Figure 4:
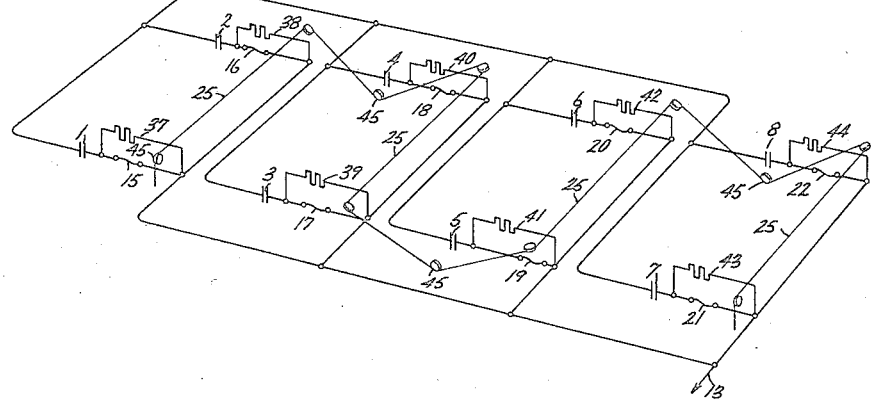

In the drawing, Fig. 1 is a diagrammatic illustration of a particular embodiment of my invention; Fig. 2 is a detailed view of a circuit breaker adapted for use with the system of Fig. 1; Fig. 3 is a diagrammatic view of a modification of my invention in which the same number of capacitor units as in Fig. 1 are grouped for use on a circuit of twice the voltage of Fig. 1, and Fig. 4 is a diagrammatic view of still another modification of my invention in which the same capacitors are grouped for use on a circuit of half the voltage of Fig. 1.

Referring now to Fig. 1 of the accompanying drawing, I have shown therein eight similar capacitors numbered 1 to 8, inclusive, arranged in a series-parallel connection of four parallel groups of two series connected capacitors. Thus, from one side, 9, of a circuit the current divides through four parallel paths comprising, respectively, capacitors 1 and 3, capacitors 2 and 4, capacitors 8 and 6, and capacitors 7 and 5. The return current flows from the first two parallel groups through a circuit breaker 10 comprising a fixed contact 11 and a movable contact 12, to the other side 13 of the circuit. The return current for the remaining two parallel connected groups of capacitors is through a circuit breaker 14. Associated with each capacitor is an individual fuse designated by reference characters 15 to 22, inclusive, corresponding to capacitors 1 to 8, respectively. These fuses are designed so as not to blow on double current, but to blow on currents in excess of the double rated current of a capacitor unit.

My protective equipment for the above described connection comprises resistance heater elements 23 and 24, which are connected between normally equal voltage points in the series-parallel connection of the capacitors. Thus heater element 23 connects points intermediate capacitors 1 and 3 on the one hand, and capacitors 2 and 4 on the other hand, whereas heater element 24 connects points intermediate capacitors 5 and 7 on the one hand, and capacitors 6 and 8 on the other hand. It will be seen that with such a connection, the equivalent of a Wheatstone bridge is produced in which the four capacitors to which each one of the heater elements is connected constitute the four arms of the bridge and the heater element corresponds to the usual galvanometer circuit of a bridge. With such an arrangement, if either one of the four capacitors with which a heater element is associated should fail in such a manner as to become short circuited, all of the current which normally would flow through its corresponding parallel capacitor will flow through the short circuited capacitor, and this current after passing through the short circuited capacitor, will then divide and half of it will flow through the heater element. Under normal conditions, however, when all of the capacitors are in service, substantially no current flows through the heater elements as the voltage drops in the parallel branch circuits between which the heater elements are connected are equal and consequently there is substantially no voltage tending to produce a current flow through the heater elements.

Associated with each of the heater elements is a combustible material, such for example, as a tensioned silk cord 25, which may all be in one piece, as shown in Fig. 3, or which may be divided into two parts connected respectively to stops or pins 26. The cord associated with the heater 23 may be tensioned by a suitable tensioning means, such as a spring 26', for urging the contact 12 out of engagement with the contact 11, while the cord 25 associated with the heater 24 may be tensioned by a spring 27, which urges a switch 28 to its closed position. The switch 28 is connected to a suitable source of current supply, such as a battery 29, and when closed it energizes a tripping coil 30 for circuit breaker 14 and also a circuit for energizing a suitable signal, such as a bell 31.

In operation, if either one of capacitors 1, 2, 3 or 4 should fail the heater element 23 would become energized, as has previously been described, and this element can be so designed that the current flowing through it will heat it to a sufficiently high temperature to burn through cord 25, thereby permitting the spring 26 to separate the contact 12 from the contact 11, thereby breaking the circuit of the series-parallel connection of the four capacitors 1, 2, 3 and 4, and removing this section of the installation from service. This serves to protect the installation as soon as any one of the four capacitor units fails. Similarly, if either one of capacitors 5, 6, 7 or 8 should fail, heater element 24 will become energized and this would burn through the cord 25, thereby allowing spring 27 to close switch 28, whereby circuit breaker 14 is tripped and signal 31 is energized. The tripping of circuit breaker 14 will take the group of four capacitors 5, 6, 7 and 8 out of service as soon as any one of them should fail.

Fig. 2 shows a detailed view of the circuit breaker mechanism for controlling the disconnection of the capacitors 1, 2, 3 and 4 from the circuit. This mechanism comprises a glass, or other suitable insulating cylinder 32, separating conducting end members 33 and 34. End member 33 carries contact 11 and has an opening therein through which cord 25 passes for holding contact 12 in engagement with contact 11. Interconnecting end member 34 and contact 12 is spring 26'. The entire device is preferably filled with a suitable insulating material, such as oil 35, of the type which is used in circuit breakers and the container is preferably vented.

In the modification shown in Fig. 3 the capacitors are arranged in two parallel connected groups of four series connected capacitors each. With such an arrangement the same kva. rating as in Fig. 1 is obtained at twice the voltage for which the arrangement of Fig. 1 is adapted to use. In this figure an additional heater element 36 is connected between the intermediate points of capacitors 3 and 5 on the one hand and capacitors 4 and 6 on the other hand. Also the cord 25 is zigzagged between the three heaters 23, 36 and 24 so that it is in engagement with all three of the heaters and will be burned through whenever any one of these heaters is energized. The cord 25 may be made to operate signals or circuit breakers in the manner shown in Fig. 1, if desired, or it may simply be utilized as a means for indicating the approximate location of a failed capacitor. Fig. 3 operates in the same general manner as Fig. 1 in that failure of any one capacitor unbalances the bridge circuit of which it comprises one arm, thereby energizing the associated heater element.

In Fig. 4 all eight capacitors are connected in parallel so that the same kva. rating is obtained at one-half the voltage for which the arrangement of Fig. 1 is adapted and at one-fourth the voltage for which the arrangement of Fig. 3 is adapted to be operated. Due to the fact that all eight capacitors are connected in parallel, it is impossible to utilize an unbalanced current, as in Figs. 1 and 3, for operating the heater elements and consequently I have illustrated a different type of protective arrangement in Fig. 4. In this figure, the fuses which are associated with each capacitor are shunted by heater elements 37, 38, 39, 40, 41, 42, 43 and 44, respectively. These heater elements may either be combined heater and resistance units or they may be combinations of heater units and resistors in series, such as is shown in the drawing. The combustible cord 25 is strung zigzag across all of the eight heater units, preferably by means of suitably located pulleys 45, so that the cord is in engagement with each one of the heater units.

During normal operation the resistance of the fuses is so much less than the resistance of the heater elements which shunt them that practically all of the current flows through the fuses, and practically none of it flows through the heater elements. However, upon failure of a capacitor, its associated fuse will blow, thereby connecting the heater element associated with the fuse of the failed capacitor directly across the circuit, whereby it will carry a greatly increased current and will become heated, thereby burning through the cord 25. The burning through of the cord 25 may be made to operate suitable protective apparatus in the manner shown in connection with the arrangement of Fig. 1.

Although the failures of the units or capacitors which have been specifically referred to above have been failures resulting in short circuiting of the units or capacitors, I wish it to be understood that my invention is not limited to such failures and that failures of the type in which the failed units become open circuited are also protected against and indicated by my invention. Thus, in Figs. 1 and 3, should a capacitor unit or its associated fuse, or both, fail in the sense that they become open circuited through any cause whatsoever, the bridge connection of which they form a part will become unbalanced, thereby causing current to flow through the adjacent heater element and operating the apparatus. Also, in Fig. 4, the failure of any one of the fuses will cause energization of its parallel connected heater element with the result that the protective and indicating apparatus will be operated.

While I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric circuit, an electrical unit connected therein, a normally substantially deenergized heater element, means including electrical connections for operatively energizing said heater from said circuit in response to failure of said unit, combustible material placed adjacent said heater and adapted to be burned through when said heater element is operatively energized, and protective means operative in response to the burning through of said combustible material.

2. In combination, an electric circuit, a capacitor therein, a normally substantially deenergized electric heater element, means including electrical connections for operably energizing said heater from said circuit in response to failure of said capacitor, a switch in said circuit, means biasing said switch to its open position, means including combustible material for normally holding said switch closed, said combustible material being placed adjacent said heater element and being adapted to be burned through when said element is operatively energized.

3. In combination, an electric circuit, a plurality of electrical devices connected in series-parallel in said circuit, a heater element connected between normally equal voltage points in said series-parallel connection, and protective means arranged to be responsive to the operation of said heater element.

4. In combination, an electric circuit, a plurality of capacitors connected therein, a heater element connected to the circuit including said capacitors in such a manner that failure of a capacitor causes energization of said element, heat responsive means arranged adjacent said element so as to be actuated when the element is energized, and protective means operated by the actuation of said means.

5. In combination, a plurality of capacitors connected in series-parallel, heater elements connected between normally equal voltage points of said series-parallel connection, and a combustible tensioned cord zig-zagged between said heater elements.

6. In combination, an electric circuit, two groups of series connected similar capacitors connected in parallel in said circuit, resistance heaters connected between equal potential points of the parallel series groups, a combustible cord tensioned against each of said heaters, protective means restrained by said cord from assuming a protective condition and biasing means for urging said protective means to a protective condition.

7. In combination, an electric circuit, an electrical device connected therein, a protective fuse connected in circuit with said device, a relatively high resistance heater element connected in parallel with said fuse, combustible material placed adjacent said heater element and adapted to be burned through by heat from said element, and protective means operated in response to the burning through of said material.

8. In combination, an electric circuit, a capacitor connected therein, a fuse connected in series with said capacitor, a heater element connected in parallel with said fuse, combustible material placed adjacent said heater element and adapted to be burned through by heat from said element, and protective means arranged to be actuated in response to the burning through of said material.

JOHN K. STAFFORD.